United States Patent [19]
Duclos et al.

[11] Patent Number: 5,943,338
[45] Date of Patent: Aug. 24, 1999

[54] REDUNDANT ATM INTERCONNECT MECHANISM

[75] Inventors: Michael B. Duclos, Stow, Mass.; William C. Mallard, Nashua, N.H.; David X. Walls, Westboro; Jeffrey A. Gross, Milford, both of Mass.

[73] Assignee: 3Com Corporation, Santa Clara, Calif.

[21] Appl. No.: 08/699,564

[22] Filed: Aug. 19, 1996

[51] Int. Cl.$^6$ .................................................. H04L 12/56
[52] U.S. Cl. .............................................................. 370/395
[58] Field of Search .................................... 370/395, 396, 370/216, 217, 408, 401, 428, 397, 399, 400, 409, 474, 476, 465, 466, 467, 471, 351, 352

[56] References Cited

U.S. PATENT DOCUMENTS

| | | | |
|---|---|---|---|
| 5,570,362 | 10/1996 | Nishimura | 370/389 |
| 5,633,870 | 5/1997 | Gaytan et al. | 370/468 |
| 5,638,356 | 6/1997 | Hijikata | 370/395 |

OTHER PUBLICATIONS

"A Primer on FDDI: Fiber Distributed Data Interface", Digital Equipment Corporation, Chapter 7, Version 2.0 © 1992, pp. 71–85.

"Emerging High Speed LANs", K. Annamalai, Raytheon Technical Paper, pp. 1–16 (note pp. 8–9).

"Serial Buses Blaze Ahead of Parallel Solutions", Computer Design, Aug. 1996, pp. 51–64 (note pp. 55–56).

*Primary Examiner*—Dang Ton
*Attorney, Agent, or Firm*—McGlew and Tuttle, P.C.

[57] ABSTRACT

An improvement to conventional ATM network paradigms involves the distribution of ATM switching functions across a large number of ATM switching units, each of which may typically provide a limited number of available ports, and by establishing multiple connections between the larger number of ATM switching units in a partially redundant "chained" configuration analogous to various ring type topologies. A plurality of "XNODES" each comprising a packet segmentation/reassembly circuit and an ATM switching circuit may be interconnected in various ways to form redundant ATM paths without the need to replicate large and expensive ATM switches.

25 Claims, 9 Drawing Sheets

REDUNDANT ATM INTERCONNECT MECHANISM

BACKGROUND OF THE INVENTION

1. Technical Field

This invention relates generally to improvements in ATM connection topologies which provide redundant connection paths without the need to replicate ATM switches.

2. Related Information

Asynchronous Transfer Mode (ATM) is a high bandwidth network transmission and switching technology which provides the ability to cross LAN and WAN boundaries, and can transport different voice, data and video signals. FIG. 1 shows an illustrative example of multiple ATM switches connected to form a network. Computers 1 and 2 are coupled to a hub 4 which is in turn connected to ATM switch 6. Computer 3 is coupled to ATM switch 5 which is in turn coupled to ATM switch 9 within a wide-area network (WAN) 8. Similarly, computer 7 is coupled to ATM switch 6 which is coupled to ATM switch 9.

The topology shown in FIG. 1 allows each computer to communicate with the others through one or more ATM switches. Computers 1 and 2 may be coupled to an Ethernet LAN and thus include Ethernet interfaces 1a and 2a, respectively. Hub 4 may serve to convert ATM cell switching and forwarding information into non-ATM protocols such as Ethernet and vice versa. Computer 3 and 7, on the other hand, may be directly linked to ATM switches through ATM interfaces 3a and 7a, respectively. It will be appreciated that although computers are shown connected to ATM switches in FIG. 1, in general any type of data source or data sink can be coupled to an ATM switch, and the present invention also contemplates such devices. Examples include net server routers, video data sources, a modem pool, or the like.

ATM technology contemplates the transmission of fixed size data "cells", a connection-oriented topology, hardware routing features, and rate independence. Each ATM cell has a fixed cell size of 53 bytes, compared to typical LAN packets of several kilobytes. ATM cells consist of a 5 byte header and a 48 byte payload. By limiting the amount of processing required to switch each cell, it is possible to implement switching functions in hardware, with corresponding potential for higher bandwidths.

Unlike connectionless Ethernet LANs, the ATM paradigm requires that a connection be established between source and destination switches before any data can flow between them. Since connections are established only when requested by an end station, ATM switches allocate bandwidth on demand. The use of hardware routing instead of software routing greatly reduces cell delays down to a few microseconds. In addition, ATM does not specify any specific rates or physical media, allowing it to scale up to support a variety of user requirements.

A typical ATM switch must perform three main functions: call set-up, maintenance and tear-down; cell routing; and traffic management. A system manager within the ATM switch negotiates connection parameters during the call set-up process. At tear-down, the connections are terminated and switch resources are freed.

ATM switches manage virtual channels (VCs) and virtual paths (VPs). Identifiers indicating a particular VC and VP are known as a virtual channel identifier (VCI) and virtual path identifier (VPI), respectively. Referring to FIG. 2, an ATM physical link 200 may carry one or more VPs 201, 202, and 203. Each VP can be viewed as a cable that contains many wires or VCs. For example, VP3 (element 203) contains three VCs 208, 209 and 210.

Every ATM switch contains a local translation table that maintains routing information, as well as new VPI/VCI values for each connection. VPI/VCI values are established for each switch during call set-up and may be reused after tear-down. This allows ATM to support very large networks while keeping the connection identifiers short enough to maintain low switch latency times.

The basic operation of an ATM switch is to receive a cell across a link on a known VPI/VCI value; look up the connection value in the local translation table to determine the outgoing port (or ports) of the connection and the new VPI/VCI value of the connection on that link; and to then retransmit the cell on that outgoing link with the appropriate connection identifiers.

FIG. 3 is an exemplary schematic representation of the VPs and VCs within a switch. VC1, part of element 301, is connected on output to VC3 of VP3 (element 302). VC2, also part of element 301, is connected to VC4 of element 304. Both VC1 and VC2 within VP4 (element 303) are connected to VC1 and VC2 of VP5 on output. Connection 303 is an example of a switched virtual path wherein the path as a whole is switched.

FIG. 4 provides an example of VP switching showing VPI/VCI value assignments. Computers 401 and 402 are connected to ATM switch 403, and computer 406 and 407 are connected to ATM switch 405. Middle ATM switch 404 performs the VP switching function. A VP is established which extends the length of all three switches. Note that in general, VPI and VCI identifiers are unique, and VP switching is a "special case" of ATM switching. The VC extends across all three switches and computers. The VPI/VCI value pairs are represented within parentheses as (VPI, VCI).

Each ATM switch maintains a local translation routing table which contains new VPI/VCI values for each connection. During operation, each ATM switch scans the incoming cells at its input ports, determines the output port(s) it is to be transmitted from and changes the VPI/VCI field in the cell header in preparation for transmission to the output port(s). Middle ATM switch 404, which performs the VP switching function, does not alter the value of the VCI. Thus, in conventional ATM networks, a central switch such as ATM switch 404 is used to perform virtual path switching.

One problem inherent in networks of ATM switches is the risk that an ATM switch will fail, thus disrupting one or more portions of the network. One solution to this problem is to provide redundant ATM switches at various points in the network, thus providing some measure of fault tolerance in the system.

FIG. 5, for example, shows one possible solution to the above-identified problems. Redundant ATM switches 505 and 506 are each coupled to each ATM node 501 through 504. Each redundant ATM switch 505 and 506 is, in turn, coupled to an external connection which may be further coupled to another ATM switch 507.

The failure of either ATM switch 505 or 506 allows the network to continue operation since each ATM node remains coupled to an operable ATM switch. However, the solution shown in FIG. 5 is undesirable because of its cost (i.e., redundant ATM switches 505 and 506) and complexity. Accordingly, there remains a problem of providing redundant capabilities without replicating ATM switches.

Another problem inherent in networks of ATM switches is the creation of load imbalances which can result when there is more than one path between two endpoints. Thus, for example, referring to FIG. 5, traffic from ATM node 501 destined for a node on the other side of ATM switch 507 could take either one of two paths: one through ATM switch 505 and external connection A, or one through ATM switch 506 and external connection B. However, assume that for various reasons, ATM nodes 501 through 504 all have paths set up through ATM switch 505, causing external connection A to be fully used, but external connection B (and ATM switch 506) to be entirely unused. This results in traffic being unevenly distributed among alternative paths.

Yet another disadvantage with the redundant ATM switch configuration shown in FIG. 5 is the cost associated with providing additional ATM ports. ATM switches tend to be more expensive given that they have more ports, so the total ATM port count of the system is an important parameter. Moreover, each ATM node (elements 501 through 504) must support a minimum of two ATM ports. A disadvantage of the redundant ATM switch configuration shown in FIG. 5 is that if load balancing is to be addressed, it must be done in the software residing in the ATM nodes. Accordingly, there remains a need for improvement.

SUMMARY OF THE INVENTION

In consideration of the various problems described above, the present invention contemplates modifying the conventional ATM switch and node design to provide internode connectivity, connectivity to an external network, and redundant connections among nodes without requiring the use of redundant ATM switches.

Conventional ATM switches are generally complex and expensive because they must support dozens of channels or "ports" (typically, 16 to 32 ports per ATM switch). Thus, constructing a network of ATM switches with redundant connection capability in the conventional manner using ATM switches requires a substantial monetary investment. In contrast to conventional paradigms, the present invention contemplates the use of much smaller ATM functions (e.g., 2 or 3 ports per ATM switch) which can be efficiently distributed across a much larger number of devices. Accordingly, the overall cost of the network can be reduced.

Various aspects of the invention contemplate changing the partitioning of ATM interconnect mechanisms in such a way that the ATM switching function is distributed among ATM nodes with a small number of ports per switching function. In other words, the ATM switching function is distributed across the nodes which are interconnected, instead of using a centralized switching function as in conventional systems. Each ATM switching function can be implemented inexpensively with a small number of ports (e.g., 2 or 3), and the switching topology can in many respects resemble that of a "ring" network such as FDDI.

In an embodiment of the invention shown in FIG. 6, a plurality of "XNODES" each of which includes an ATM connection endpoint with a switching capability are coupled either to two other XNODES, or to another XNODE and a central ATM switch which is in turn coupled to an external connection. A variation of this embodiment contemplates bypassing the central ATM switch.

In an embodiment of the invention shown in FIG. 7, a plurality of XNODES, each having an ATM switching feature, are coupled to two other XNODES. Additionally, one or more XNODES in the configuration are also coupled to a centralized ATM switch which is in turn coupled to an external connection. The variation on this embodiment shown in FIG. 7 contemplates bypassing the central ATM switch with a redundant connection link 720.

In an embodiment of the invention shown in FIGS. 8 and 9, a plurality of XNODES, each having an ATM switching feature, are coupled to two other XNODES. Additionally in FIG. 8, one or more XNODES in the configuration is also coupled to a centralized ATM switch which is in turn coupled to an external connection. Finally, one or more XNODES have "jumper" paths to other XNODES, such that some XNODES in the configuration are coupled to three other XNODES. A variation of this embodiment contemplates eliminating the need for a centralized ATM switch.

Other objects and advantages of the invention will become apparent through the following detailed description, the figures, and the appended claims.

DETAILED DESCRIPTION OF THE PREFERRED EMBODIMENTS

Figure 6:
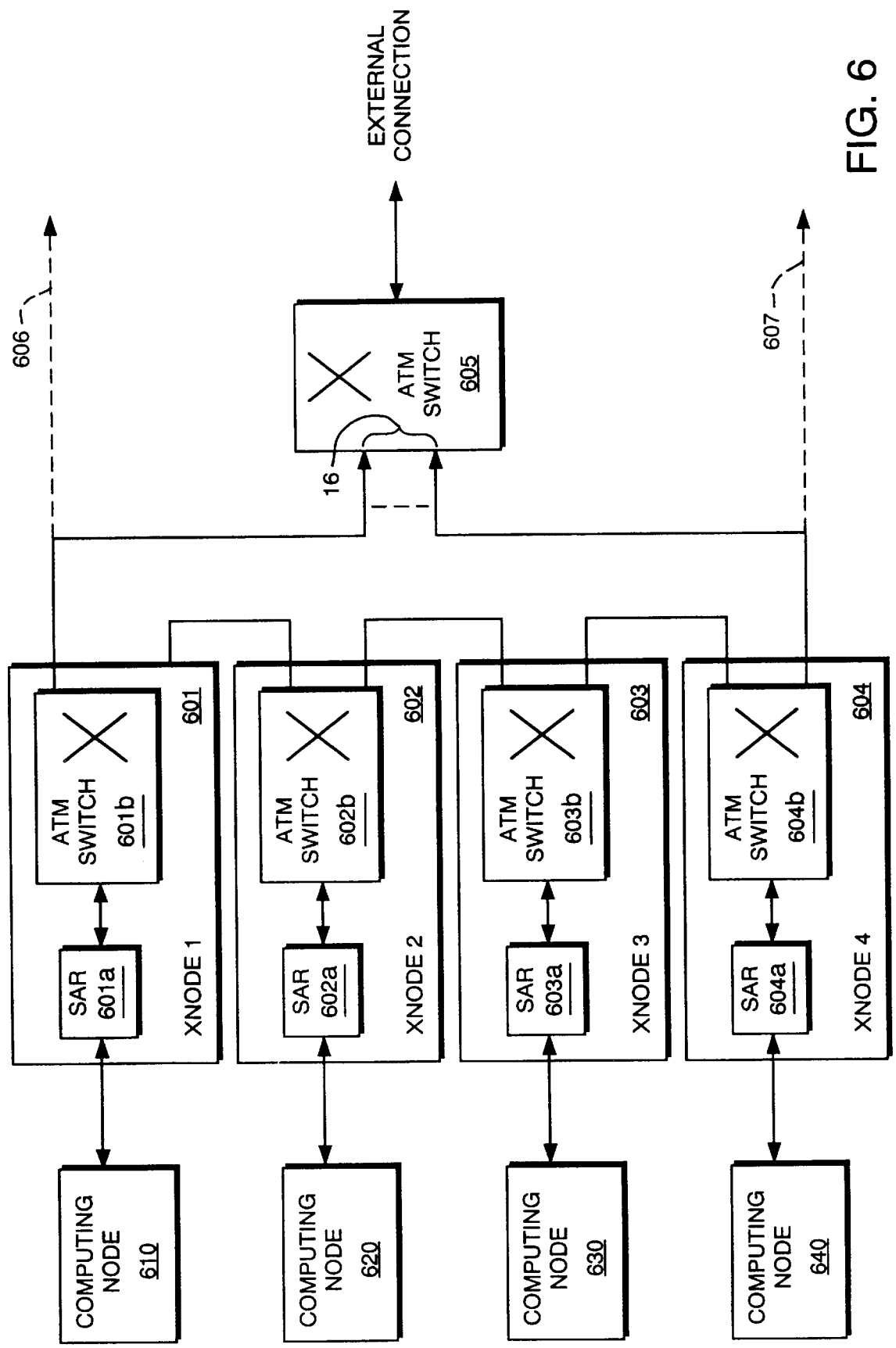
FIG. 6 shows a configuration employing various inventive principles in which each of a plurality of XNODES is coupled to either two other XNODES or to another XNODE and an ATM switch.

FIG. 6 shows a system which employs various principles of the present invention. External ATM switch 605 comprises a conventional ATM switch as described with reference to FIGS. 1 through 4, and typically provides dozens of ports (e.g., 16 or 32) each of which may be linked to a port associated with another ATM switch or to a computing node through a suitable ATM interface.

Four XNODES 601 through 604 each comprise a segmentation and reassembly circuit or equivalent software function (601a through 604a) and an internal ATM switch or equivalent software function (601b through 604b). Each internal ATM switch provides ATM switching functions as are conventionally known in the art. However, in contrast to external ATM switch 605, each internal ATM switch preferably comprises only a very limited number of externally accessible ATM ports, such as 2 or 3, such that the total cost of manufacturing each XNODE is maintained to a minimum. An additional "internal" ATM switch port may be used to couple each SAR to the internal ATM switching function in each XNODE.

Each XNODE is coupled to a computing node (610 through 640) which may, for example, generate data packets for transmission through the ATM network and receive reassembled data packets from the ATM network (the term "data packet" should be interpreted broadly to include both fixed size and variable size data quantities).

Segmentation and reassembly circuits 601a through 604a each segment data packets received from each computing node into standard ATM cells which are provided to a corresponding internal ATM switch. It should be recognized that some of the computing nodes 610 through 640 may only generate data packets while others may only receive reassembled data packets; yet others may both generate and receive data packets (i.e., bidirectional data transfer is also contemplated). In the reverse data path, SARs 601a through 604a reassemble cells received from ATM switches 601b through 604b into data packets compatible with computing nodes 610 through 640. Although not explicitly shown in FIG. 6, various types of LAN or WAN adapter devices could be used, such as an Ethernet packet converter, LAN emulation converter, IP over ATM converter, and the like to convert data packets from one format to another between the computing nodes and XNODES.

Also in contrast to conventional systems, each XNODE may be coupled to a neighboring XNODE, such that a large number of ATM switches each having a very limited number of ports are connected to each other. The effect of this configuration is to distribute the ATM switching function among a large number of limited capability ATM switches, thus eliminating the need for supplying centrally located, higher port count (and more expensive) ATM switches.

In general, ATM switch ports are expensive. Therefore, reducing the number of ATM switch ports can reduce the cost of a given ATM network topology. Compare, for example, the number of ATM switch ports required to provide the redundant topology in FIG. 5 (total of 16 ports counting from the left side of switches 505 and 506) with the number required to provide the partially redundant topology of FIG. 6 (total of 10 ports at the left side of switch 605). This reduction in total ATM ports while achieving at least partial redundancy can greatly reduce the overall cost of an ATM configuration. Moreover, the cost of providing an ATM switch port on an XNODE can be expected to cost less than an equivalent port on a conventional ATM switch.

Referring again to FIG. 6, if a packet from computing node 610 is to be transmitted to computing node 640, the packet can be transmitted through XNODES 602, 603, and 604, instead of being transmitted through external ATM switch 605. While such a path incurs more overhead because of the number of ATM switches which must be traversed, the tradeoffs in redundancy, cost and simplicity are favorable. For example, while a primary path between computing nodes 610 and 640 may be through external ATM switch 605, an alternate and thus redundant path is provided through XNODES 2 and 3. Additionally, the aggregate incremental cost of providing a very limited ATM switching capacity in each of four XNODES can be much less than the cost of providing a second external ATM switch such as 605, for which much excess (and wasted) capacity can be avoided.

Figure 1:
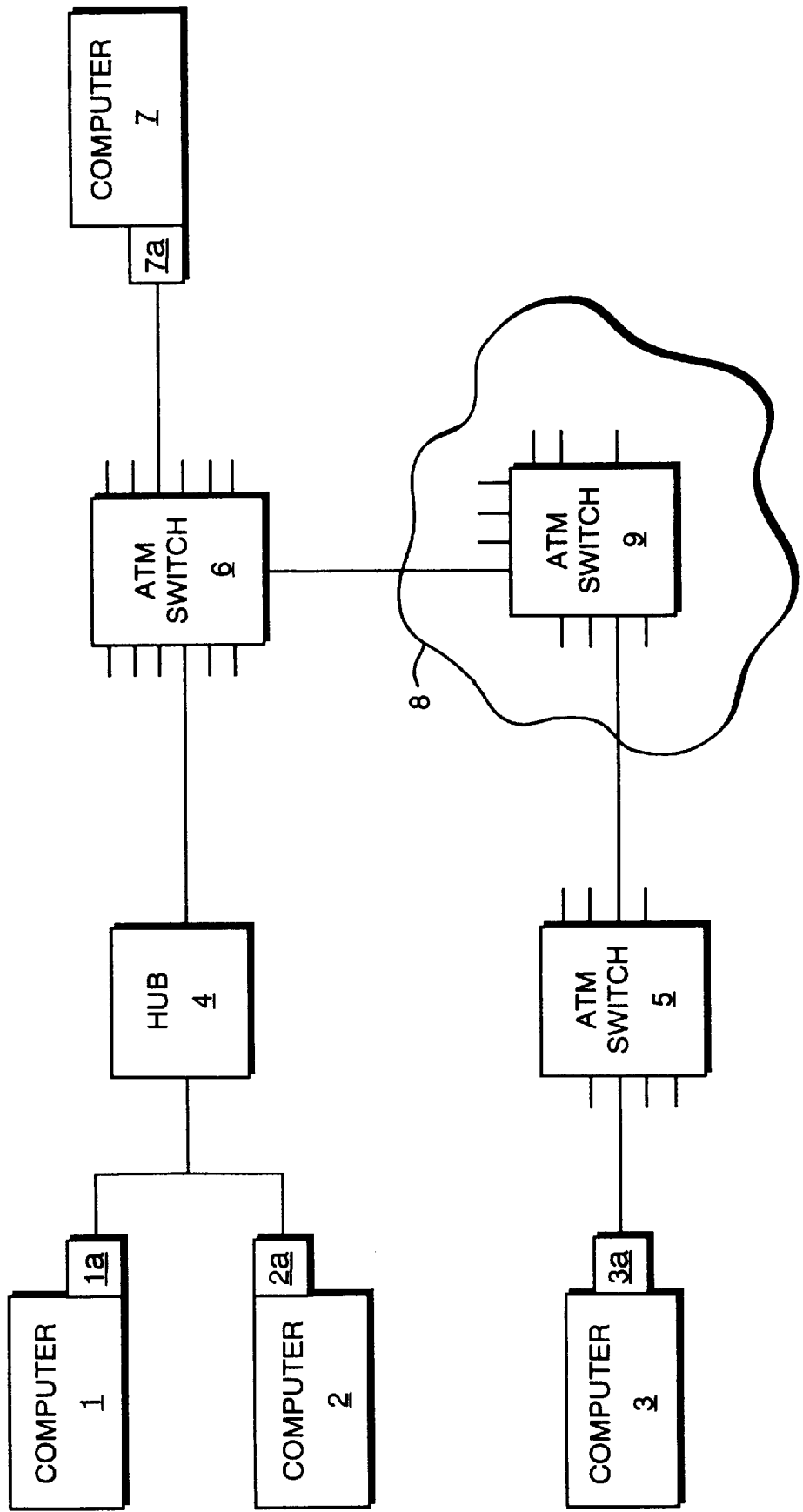
FIG. 1 shows how multiple computers can be conventionally configured to communicate with each other through a plurality of ATM switches.
Figure 2:
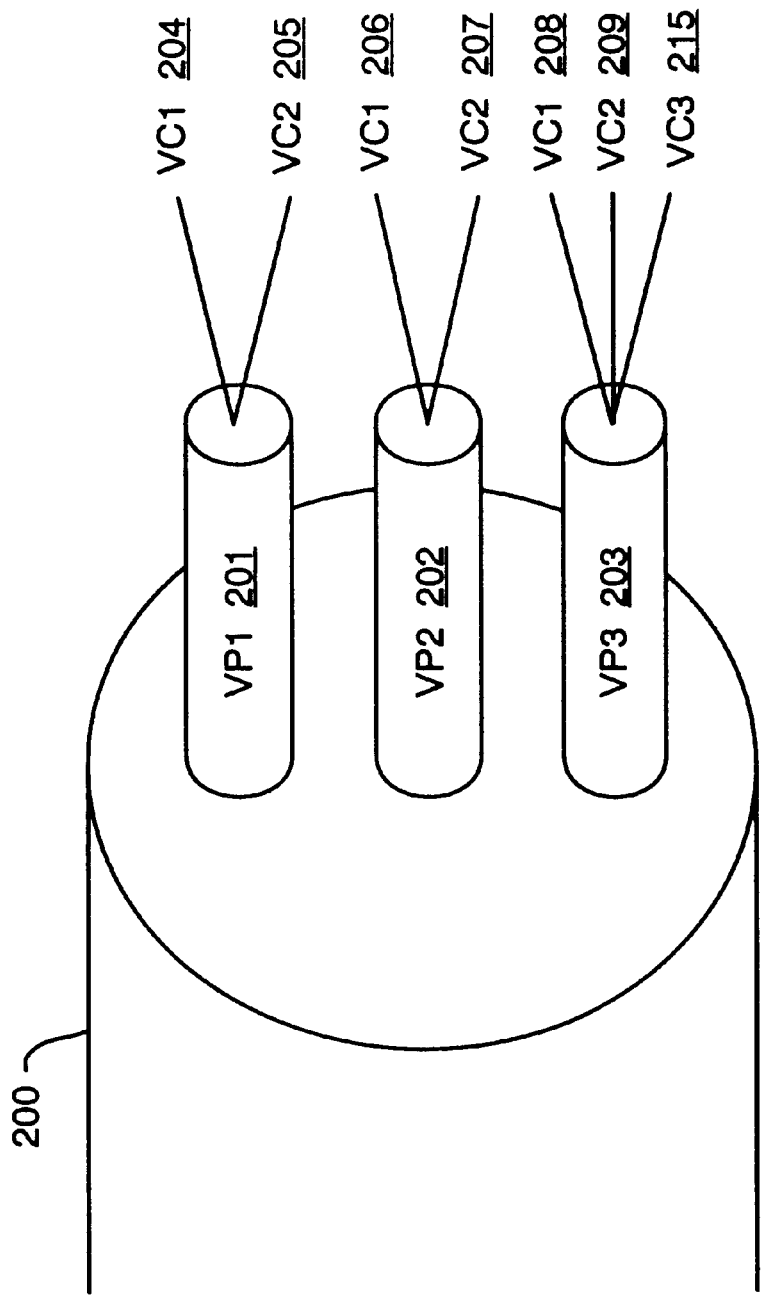
FIG. 2 shows how a physical ATM communication medium can be partitioned into virtual paths and virtual channels.
Figure 3:
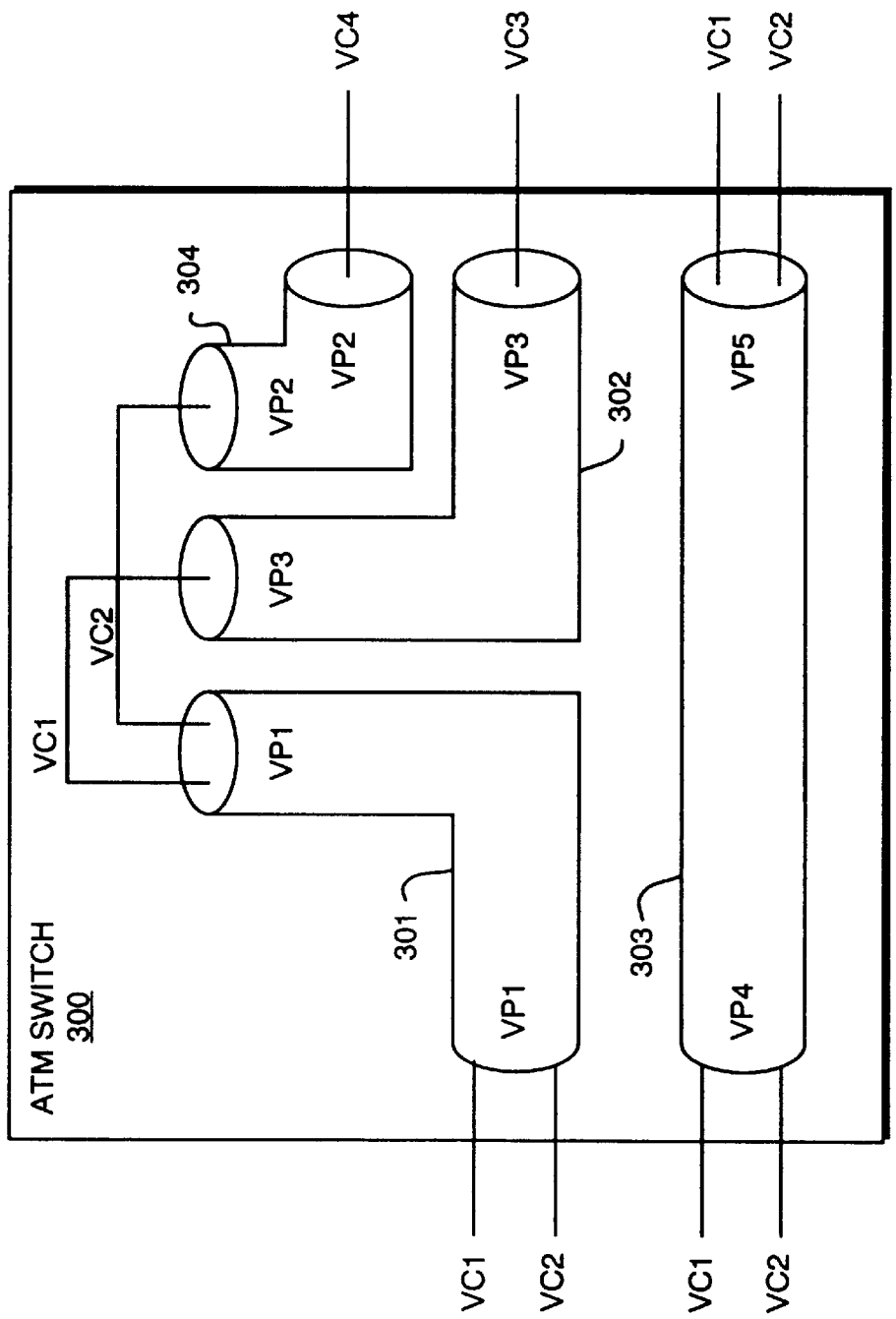
FIG. 3 provides a schematic representation of routing between virtual channels and paths inside an ATM switch.
Figure 4:
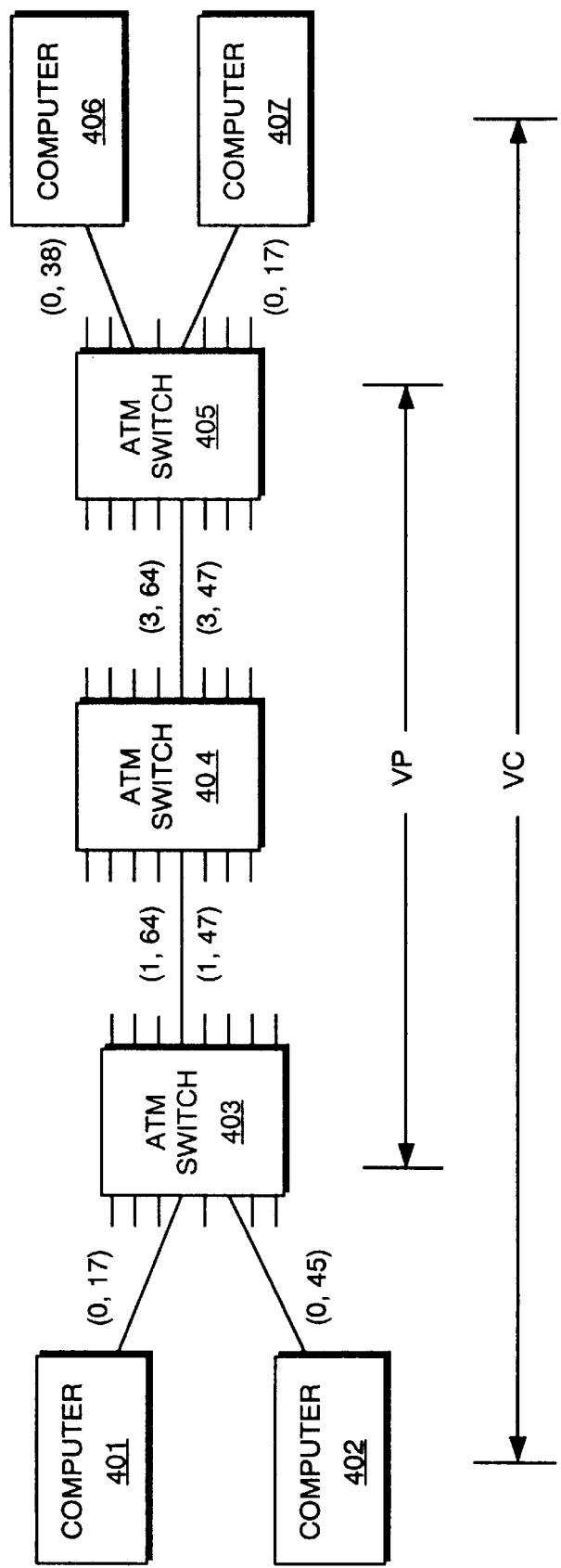
FIG. 4 shows how switching occurs through ATM switches.
Figure 5:
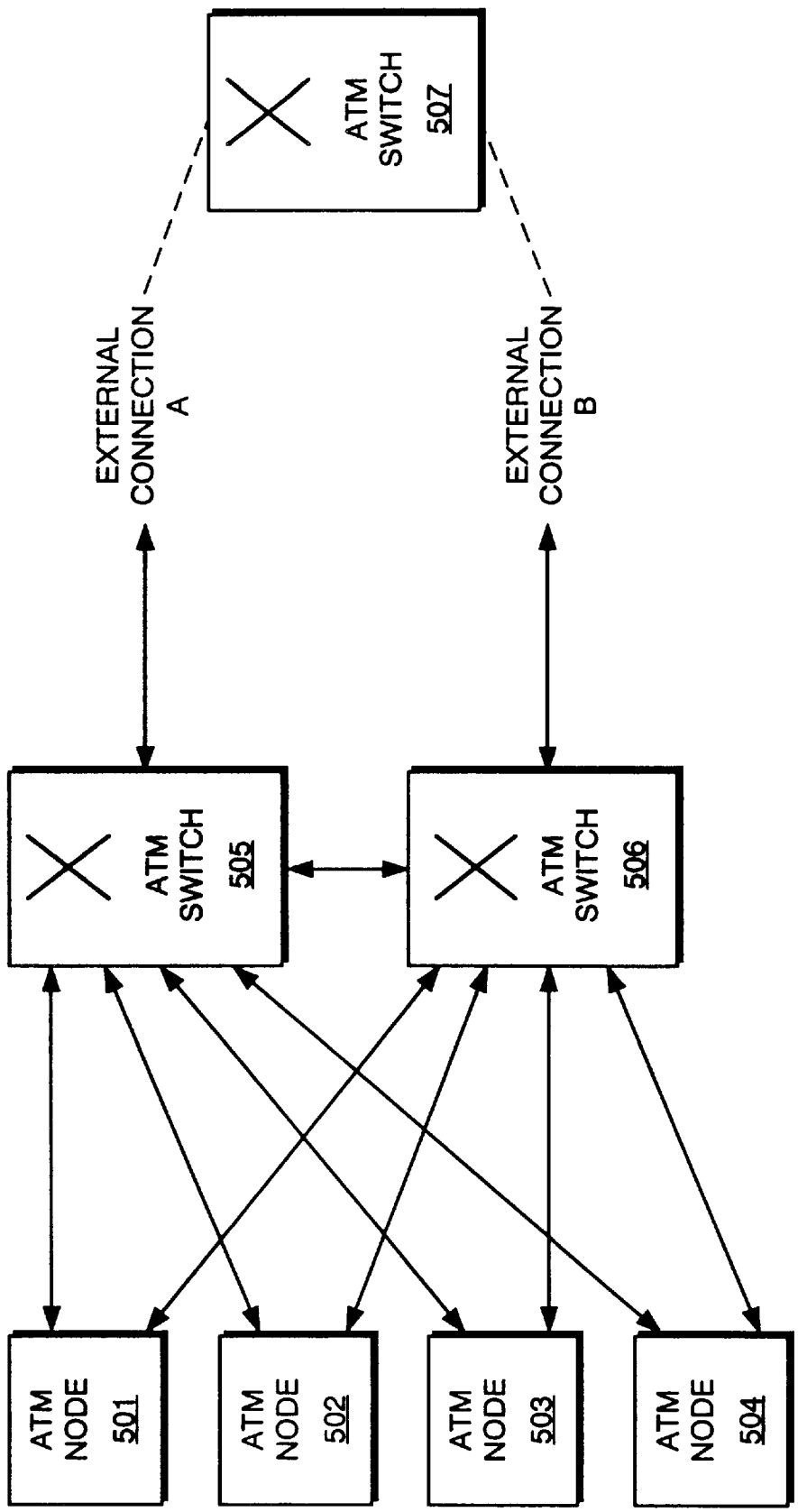
FIG. 5 illustrates how ATM path redundancy can be provided by replicating ATM switches and coupling each ATM node to multiple switches.

Note that in addition to requiring another ATM switch, each of the two ATM redundant switches would have to provide a large number of ports if each node were to be connected to both, as shown in FIG. 5. Additionally, hierarchies of ATM switches might be necessary for larger numbers of nodes, if each conventional ATM switch has at most a few dozen ports.

The circuitry comprising each XNODE may be conveniently constructed on a single card and/or housing which can be plugged into a chassis or computer base, for example. The circuitry may comprise a combination of hardware and software components as are well known in the art and currently available. As one example, the SAR and ATM switch functions could be implemented in software executing on a single processor, or these functions could be separately implemented on two different processors which are coupled via a shared memory, computer bus (e.g., PCI bus, VME bus), or the like. An application specific integrated circuit (ASIC) could also be used to implement these functions either separately or on a single ASIC.

In a variation on the embodiment of FIG. 6, external ATM switch 605 can be bypassed or eliminated, and each XNODE can instead be connected directly to an external connection (606 and 607). In order to make a "direct" connection to each XNODE, a standard interface (such as the ATM Forum's UNI or NNI specification) could be used. Alternatively, the XNODES could be used in a "private" ATM network using direct connections without any special interfaces. For example, to avoid complexities associated with signaling software, Permanent Virtual Circuits could be used.

Figure 7:
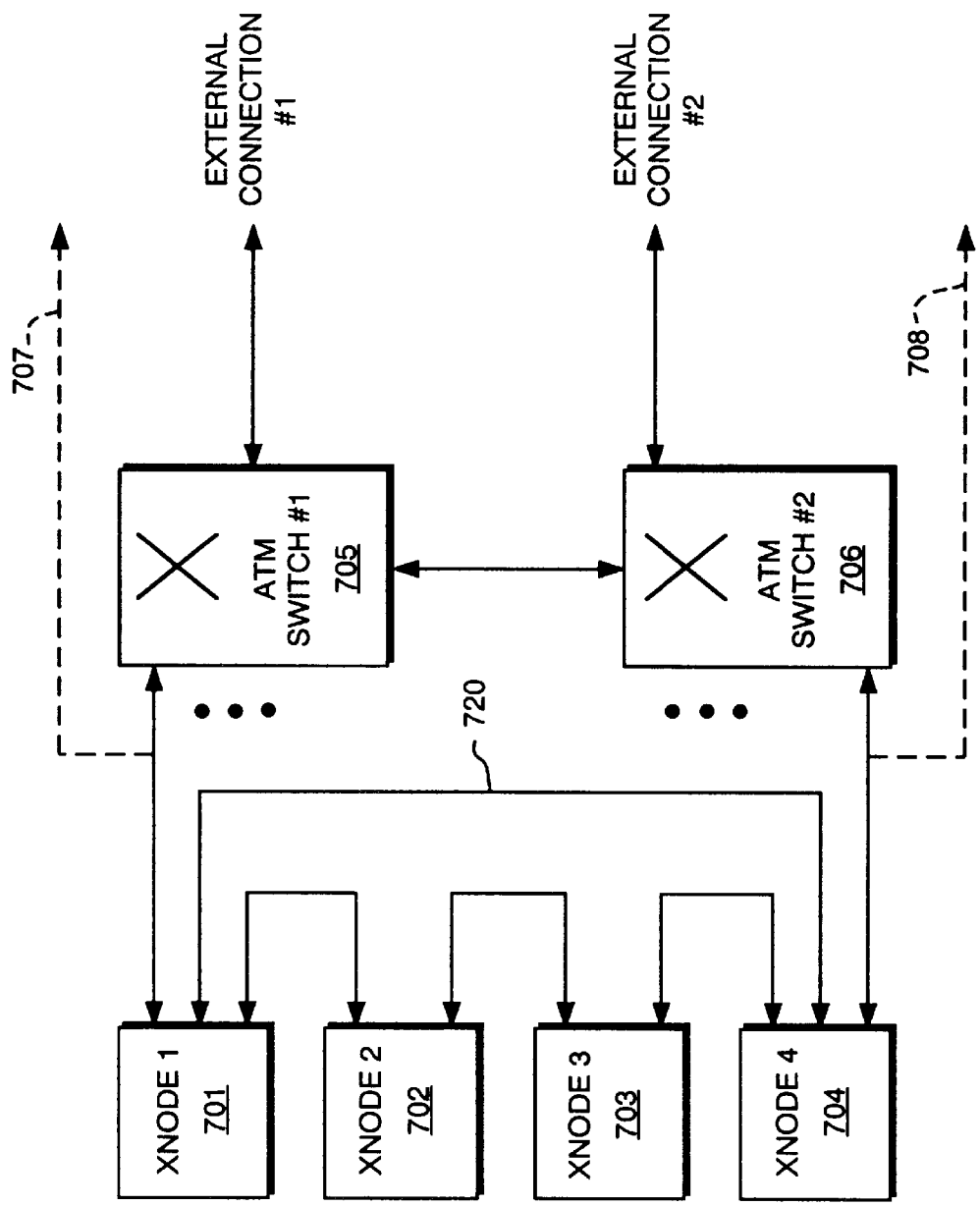
FIG. 7 shows a configuration employing various inventive principles in which each of a plurality of XNODES is coupled to either two other XNODES or to another XNODE and an ATM switch. Additionally, two or more XNODES are "jumpered" to a third XNODE.

FIG. 7 illustrates a configuration which also employs various principles of the present invention. As shown in FIG. 7, each of a plurality of XNODES 701 through 704 is coupled to either two other XNODES or to another XNODE and an external ATM switch. Additionally, two or more XNODES (elements 701 and 704) are "jumpered" together by path 720 such that these two XNODES are configured to communicate with a total of three ATM switches.

This configuration provides additional connection paths beyond those provided in FIG. 6, because three paths are now available for transmitting data between XNODE1 and XNODE4: through external ATM switches 705 and 706; through XNODE2 and XNODE3; and through path 720. Other XNODES in the configuration may be configured to support only two ports, for example. As with the configuration shown in FIG. 6, the external ATM switches may be bypassed or eliminated and thus each XNODE may be connected to an external connection. Moreover, the topology shown in FIG. 7 provides additional flexibility in balancing loads among paths, which is desirable as the number of XNODES becomes larger.

Figure 8:
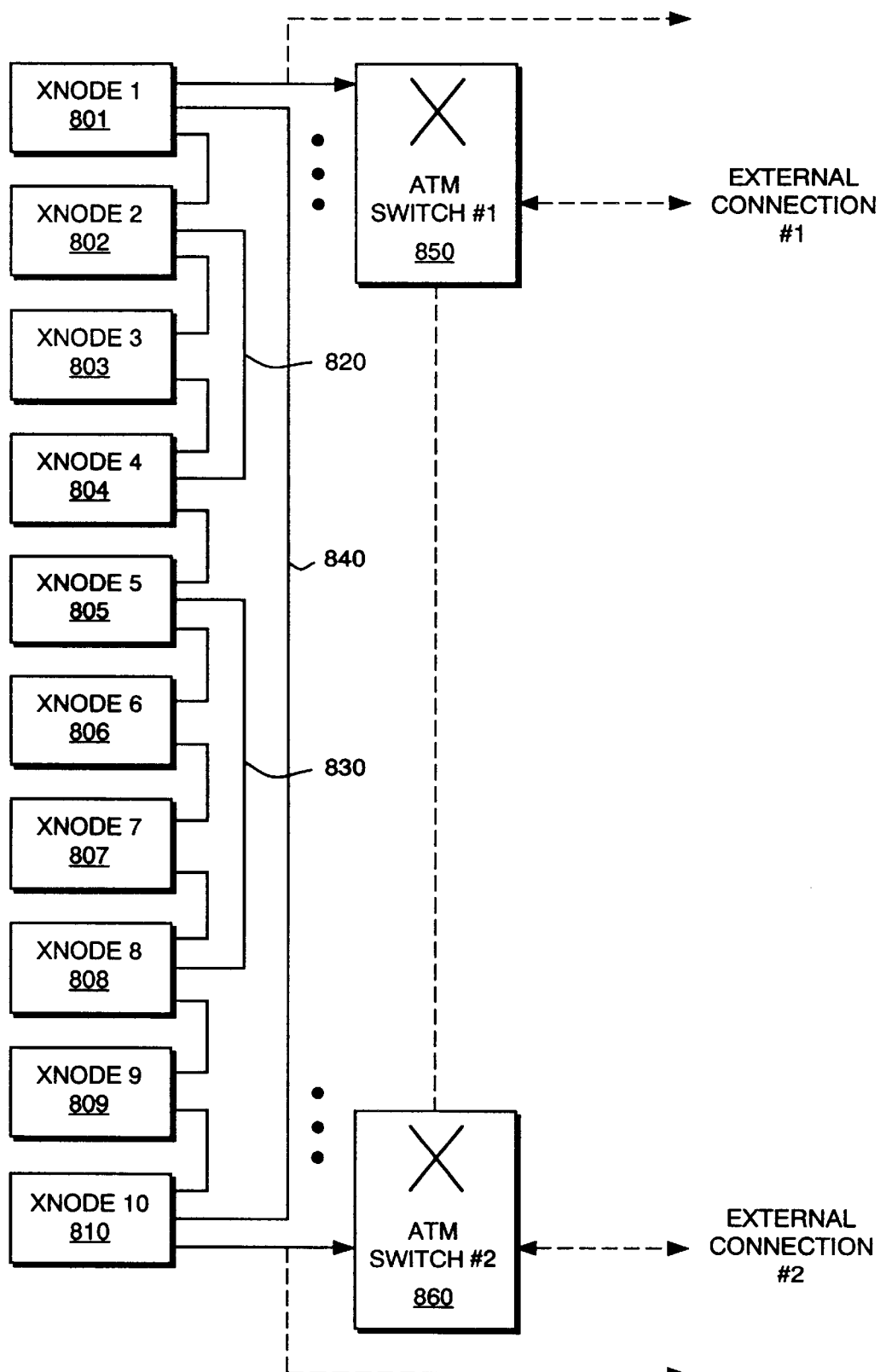
FIG. 8 shows a configuration employing various inventive principles in which each of a plurality of XNODES are coupled to at least two, and, in some cases, three other XNODES.

FIG. 8 shows a configuration also employing various principles of the present invention in which each of a plurality of XNODES are coupled to at least two, and, in some cases, three other XNODES. Two XNODES in the configuration are also coupled to an external connection either directly or through two ATM switches. Thus, for example, XNODE1 (element 801) is coupled to XNODE2 (element 802), XNODE10 (element 810), and to external ATM switch 1 (element 850). Similarly, XNODE2 (element 802) is coupled to three other XNODES. However, XNODE6 (element 806) is only coupled to two other XNODES. As with the embodiments shown in FIGS. 6 and 7, the external ATM switches 850 and 860 may be bypassed or eliminated, possibly with the use of a UNI or NNI interface.

Figure 9:
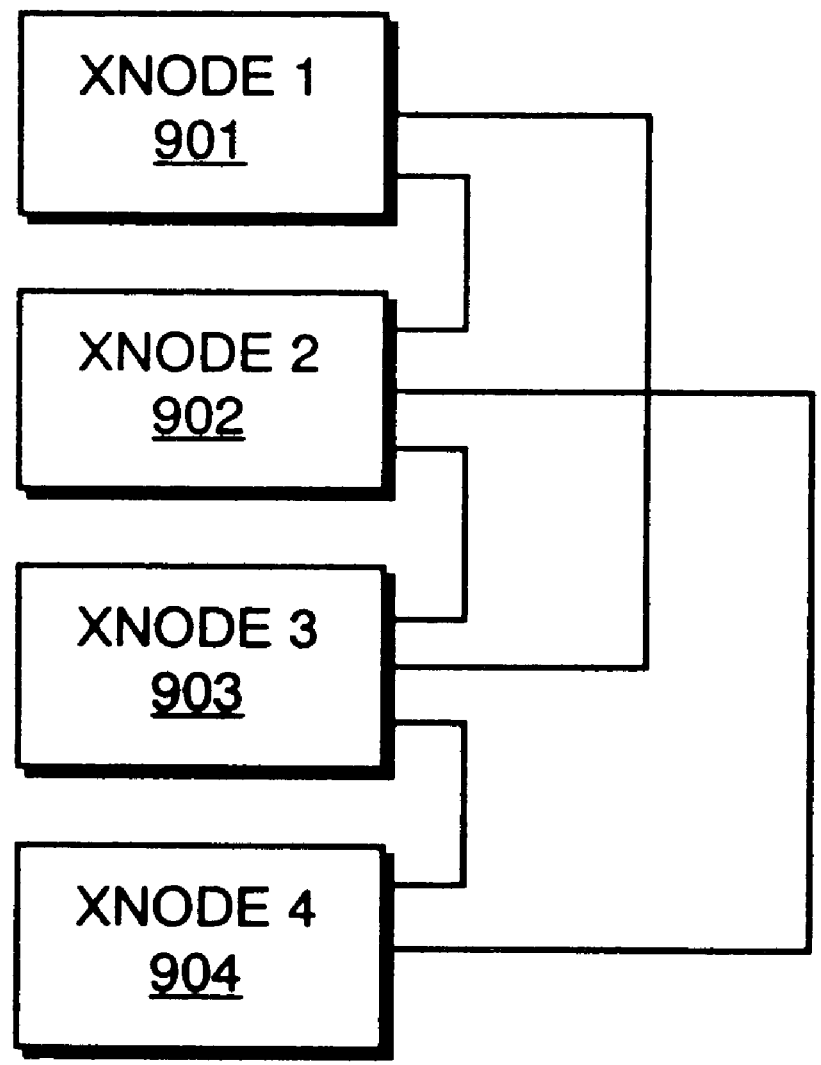
FIG. 9 shows a configuration employing various inventive principles in which each XNODE is coupled to a neighboring XNODE and, additionally, is jumpered to a non-neighboring XNODE without the need for a centralized ATM switch.

FIG. 9 shows a further configuration employing various principles of the present invention. In FIG. 9, each XNODE is coupled to a neighboring XNODE, and is also "jumpered" to a non-neighboring XNODE (i.e., XNODE1 is coupled to XNODE3, and XNODE2 is coupled to XNODE4).

There are at least two reasons for "high speed" links in a LAN. The most obvious is that of moving a large volume of information among many users/endpoints concurrently. Less obvious, but also very important to the end user, is the time between when a transaction request is made and the time it is completed (i.e., the latency). A network may be relatively lightly loaded, but if the link speed is low, the end user may have to wait longer.

One of the aspects of ATM is the contemplated use of high speed links (e.g., 155 Mbit/sec). Cost reductions in existing physical layer components will eventually lead to rates of 155 Mbit/sec ATM capabilities which cost little more than 25 Mbit/sec ATM. The present invention provides a way to use ATM in a less expensive way, which does not detract from transaction completion latency in a lightly loaded network. In effect, fewer high speed links are used to serve users in a redundant configuration (users share these high speed links, rather than having two high speed links dedicated to them alone—one to each of two centralized ATM switches for redundancy. In a lightly loaded configuration, users get the low latency benefit of high speed links without the full cost of a conventional topology. Since many user activities are inherently "bursty" (i.e., high utilization less than 5% of the time), this is the norm rather than the exception.

Thus has been described an improved ATM network topology and XNODE device which provides redundant ATM paths without the need to replicate large and expensive ATM switches having a relatively large number of ports. Instead, the inventive principles contemplate distributing ATM switching functions across a larger number of limited capability XNODES which can be constructed cheaply. The degree of redundancy and flexibility in load balancing can be selectively implemented through one or more "jumpers" which connect multiple XNODES directly together.

While various examples have illustrated the use of two or three ports per XNODE, it is contemplated that a larger number could be used per XNODE, as long as the capabilities of the ATM switches within each XNODE are much more limited as compared to the external "full capability" ATM switches which may support dozens of ports but no SAR capability.

It is apparent that many modifications and variations of the present invention are possible, and references to specific values are by example only. It will be recognized that changes to the ATM cell switching and forwarding methods will not detract from the basic principles of the present invention and that, therefore, the present invention may be practiced using new or different ATM switching methods from those presently in existence. Moreover, use of the term "circuit" in the claims should be understood to include a software implementation of a function executing on a computing device. Furthermore, the use of the term "packet" in the claims should be understood to refer either to fixed size data packets or variable size packets (as one example, Ethernet packets). It is, therefore, to be understood that within the scope of the appended claims the invention may be practiced otherwise than as specifically described.

We claim:

1. A device comprising:
    a segmentation and reassembly (SAR) circuit which receives outgoing data packets from a computing node, segments the outgoing data packets into fixed size asynchronous transfer mode (ATM) cells and outputs the fixed size cells, and which further receives and reassembles fixed size ATM cells into incoming data packets and outputs the incoming data packets to the computing node; and
    an internal ATM switching circuit, coupled to the SAR circuit, comprising externally accessible ATM ports each of which switches and forwards on the basis of a locally stored translation table fixed size cells received through that port to another one of the externally available ATM ports or, alternatively, to the SAR circuit, said internal ATM switching circuit comprising at least two externally accessible ATM ports and no more than 8 externally accessible ATM ports.

2. A system comprising first and second devices each as recited in claim 1, wherein the first and second devices are coupled between respective externally accessible ATM ports on each device.

3. A system comprising first, second, and third devices each as recited in claim 1, wherein the first and second devices are coupled between respective externally accessible ATM ports on the first and second devices, and wherein the second and third devices are coupled between respective externally accessible ATM ports on the second and third devices.

4. The system as recited in claim 3, wherein the first and third devices are coupled between respective externally accessible ATM ports on the first and third devices.

5. The system as recited in claim 4, wherein the first device is coupled to an ATM switch, which does not include a SAR circuit, through one of the externally accessible ATM ports on the first device.

6. A system comprising first, second, third, and fourth devices each as recited in claim 1, wherein the first and second devices are coupled between respective externally accessible ATM ports on the first and second devices, wherein the second and third devices are coupled between respective externally accessible ATM ports on the second and third devices, and wherein the second and fourth devices are coupled between respective externally accessible ATM ports on the second and fourth devices.

7. The device of claim 1, wherein the SAR circuit and internal ATM switching circuit are coupled by an internal ATM switching port.

8. A system comprising a device as recited in claim 1 and a computing node coupled to the device, wherein the computing node generates the first data packets and transmits them to the SAR circuit.

9. The device of claim 1, wherein the device includes only one SAR and only one internal ATM switching circuit.

10. A asynchronous transfer mode (ATM) network comprising:
    a first device with a connection to a computing node, a first device segmentation and reassembly (SAR) circuit which receives outgoing data packets from the computing node, segments the outgoing data packets into fixed size asynchronous transfer mode (ATM) cells and outputs the fixed size cells, and which further receives and reassembles fixed size ATM cells into incoming data packets and outputs the incoming data packets to the computing node and a first device internal ATM switching circuit, coupled to the first device SAR circuit, comprising externally accessible first device ATM ports each of which switches and forwards on the basis of a locally stored translation table fixed size cells received through that port to another one of the first device externally available ATM ports or, alternatively, to the first device SAR circuit, said first device internal ATM switching circuit comprising at least two first device externally accessible ATM ports and no more than eight first device externally accessible ATM ports, one of said first device externally accessible ATM ports being connected to an external device;

a second device with a connection to a computing node, a second device segmentation and reassembly (SAR) circuit which receives outgoing data packets from the computing node, segments the outgoing data packets into fixed size asynchronous transfer mode (ATM) cells and outputs the fixed size cells, and which further receives and reassembles fixed size ATM cells into incoming data packets and outputs the incoming data packets to the computing node and a second device internal ATM switching circuit, coupled to the second device SAR circuit, comprising externally accessible second device ATM ports each of which switches and forwards on the basis of a locally stored translation table fixed size cells received through that port to another one of the second device externally available ATM ports or, alternatively, to the second device SAR circuit, said second device internal ATM switching circuit comprising at least two second device externally accessible ATM ports and no more than eight second device externally accessible ATM ports, one of said second device externally accessible ATM ports being connected to the external device;

at least one intermediate device with a connection to a computing node, a intermediate device segmentation and reassembly (SAR) circuit which receives outgoing data packets from the computing node, segments the outgoing data packets into fixed size asynchronous transfer mode (ATM) cells and outputs the fixed size cells, and which further receives and reassembles fixed size ATM cells into incoming data packets and outputs the incoming data packets to the computing node and a intermediate device internal ATM switching circuit, coupled to the intermediate device SAR circuit, comprising externally accessible intermediate device ATM ports each of which switches and forwards on the basis of a locally stored translation table fixed size cells received through that port to another one of the intermediate device externally available ATM ports or, alternatively, to the intermediate device SAR circuit, said intermediate device internal ATM switching circuit comprising at least two intermediate device externally accessible ATM ports and no more than eight intermediate device externally accessible ATM ports, one of said intermediate device externally accessible ATM ports being connected to either said first device or another intermediate device and another of said intermediate device externally accessible ATM ports being connected to either said second device or another intermediate device, whereby connections of externally accessible ATM ports of said devices provide redundant paths from connected computing nodes to the external device.

11. A network according to claim 10, wherein a plurality of intermediate devices are provided successively coupled in a chained configuration, with an intermediate device externally accessible ATM port of said chained configuration connected to said first device and an intermediate device externally accessible ATM port of said chained configuration connected to said second device.

12. A network according to claim 11, wherein said first device includes a externally accessible ATM ports connected to an externally accessible ATM ports of said second device.

13. A network according to claim 10, wherein said first device includes a externally accessible ATM ports connected to an externally accessible ATM ports of said second device.

14. A network according to claim 10, wherein said external device is ports of an ATM multi-port switch.

15. A network according to claim 10, wherein the internal ATM switching circuit comprises exactly two externally accessible ATM ports.

16. A network according to claim 10, wherein the internal ATM switching circuit comprises exactly three externally accessible ATM ports.

17. A network according to claim 10, wherein the internal ATM switching circuit comprises exactly the device includes only one SAR and only one internal ATM switching circuit.

18. An asynchronous transfer mode (ATM) network comprising:

a first device with a connection to a computing node, a first device segmentation and reassembly (SAR) circuit which receives outgoing data packets from the computing node, segments the outgoing data packets into fixed size asynchronous transfer mode (ATM) cells and outputs the fixed size cells, and which further receives and reassembles fixed size ATM cells into incoming data packets and outputs the incoming data packets to the computing node and a first device internal ATM switching circuit, coupled to the first device SAR circuit, comprising externally accessible first device ATM ports each of which switches and forwards on the basis of a locally stored translation table fixed size cells received through that port to another one of the first device externally available ATM ports or, alternatively, to the first device SAR circuit, said first device internal ATM switching circuit comprising at least two first device externally accessible ATM ports and no more than 8 first device externally accessible ATM ports, one of said first device externally accessible ATM ports being connected to an external device;

a second device with a connection to a computing node, a second device segmentation and reassembly (SAR) circuit which receives outgoing data packets from the computing node, segments the outgoing data packets into fixed size asynchronous transfer mode (ATM) cells and outputs the fixed size cells, and which further receives and reassembles fixed size ATM cells into incoming data packets and outputs the incoming data packets to the computing node and a second device internal ATM switching circuit, coupled to the second device SAR circuit, comprising externally accessible second device ATM ports each of which switches and forwards on the basis of a locally stored translation table fixed size cells received through that port to another one of the second device externally available ATM ports or, alternatively, to the second device SAR circuit, said second device internal ATM switching circuit comprising at least two second device externally accessible ATM ports and no more than 8 second device externally accessible ATM ports, one of said second device externally accessible ATM ports being connected to the external device;

a plurality of intermediate device, each intermediate device having a connection to a computing node, a intermediate device segmentation and reassembly (SAR) circuit which receives outgoing data packets from the computing node, segments the outgoing data packets into fixed size asynchronous transfer mode (ATM) cells and outputs the fixed size cells, and which further receives and reassembles fixed size ATM cells into incoming data packets and outputs the incoming data packets to the computing node and a intermediate device internal ATM switching circuit, coupled to the intermediate device SAR circuit, comprising externally accessible intermediate device ATM ports each of which switches and forwards on the basis of a locally stored translation table fixed size cells received through that port to another one of the intermediate device externally available ATM ports or, alternatively, to the intermediate device SAR circuit, said intermediate device internal ATM switching circuit comprising at least two intermediate device externally accessible ATM ports and no more than eight intermediate device externally accessible ATM ports, one of said externally accessible ATM ports of each intermediate device being connected to either said first device or another intermediate device and another of said externally accessible ATM ports of each intermediate device being connected to either said second device or another intermediate device, whereby connections of externally accessible ATM ports of said devices provide redundant paths from connected computing nodes to the external device.

19. A network according to claim 18, wherein a plurality of intermediate devices are provided successively coupled in a chained configuration, with an intermediate device externally accessible ATM port of said chained configuration connected to said first device and an intermediate device externally accessible ATM port of said chained configuration connected to said second device.

20. A network according to claim 19, wherein said first device includes a externally accessible ATM ports connected to an externally accessible ATM ports of said second device.

21. A network according to claim 18, wherein said first device includes a externally accessible ATM ports connected to an externally accessible ATM ports of said second device.

22. A network according to claim 18, wherein said external device is ports of an ATM multi-port switch.

23. A network according to claim 18, wherein the internal ATM switching circuit comprises exactly two externally accessible ATM ports.

24. A network according to claim 18, wherein the internal ATM switching circuit comprises exactly three externally accessible ATM ports.

25. A network according to claim 18, wherein the internal ATM switching circuit comprises exactly the device includes only one SAR and only one internal ATM switching circuit.

* * * * *